(12) United States Patent
Tomeno et al.

(10) Patent No.: US 8,377,835 B2
(45) Date of Patent: *Feb. 19, 2013

(54) OPTICAL GLASS

(75) Inventors: Satoru Tomeno, Tokyo (JP); Yuki Kondo, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 329 days.

This patent is subject to a terminal disclaimer.

(21) Appl. No.: 12/790,141

(22) Filed: May 28, 2010

(65) Prior Publication Data

US 2010/0304950 A1  Dec. 2, 2010

(30) Foreign Application Priority Data

May 28, 2009 (JP) ................... 2009-129247

(51) Int. Cl.
*C03C 3/066* (2006.01)
(52) U.S. Cl. ............. 501/79; 501/78; 501/50; 501/51
(58) Field of Classification Search ............ 501/50, 501/51, 78, 79
See application file for complete search history.

(56) References Cited

U.S. PATENT DOCUMENTS

| 6,912,093 | B2 * | 6/2005 | Endo | 359/642 |
| 6,977,232 | B2 * | 12/2005 | Hayashi et al. | 501/79 |
| 7,138,349 | B2 * | 11/2006 | Uehara et al. | 501/78 |
| 7,491,667 | B2 * | 2/2009 | Hayashi | 501/51 |
| 2009/0176641 | A1 * | 7/2009 | Kobayashi et al. | 501/78 |
| 2010/0240516 | A1 * | 9/2010 | Tomeno et al. | 501/78 |
| 2011/0028300 | A1 * | 2/2011 | Zou et al. | 501/78 |

FOREIGN PATENT DOCUMENTS

| JP | 2003-201143 | 7/2003 |
| JP | 2003-267748 | 9/2003 |
| JP | 2006-16295 | 1/2006 |
| JP | 20013-16293 | 1/2006 |
| WO | WO 2007148816 A1 * | 12/2007 |
| WO | WO 2009096439 A1 * | 8/2009 |

OTHER PUBLICATIONS

U.S. Appl. No. 12/791,913, filed Jun. 2, 2010, Tomeno, et al.

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

The present invention relates to an optical glass containing, in terms of mass % on the basis of oxides, $B_2O_3$: 10 to 20%, $SiO_2$: 0.5 to 12%, ZnO: 5 to 19%, $Ta_2O_5$: 2.5 to 17%, $Li_2O$: 0.2 to 3%, $ZrO_2$: 0.6 to 4.9%, $WO_3$: 1 to 20%, $La_2O_3$: 25 to 50%, $Gd_2O_3$: 0 to 13%, and $Y_2O_3$: 0.2 to 20%, provided that $La_2O_3+Gd_2O_3+Y_2O_3$ is 35 to 60%, in which the optical glass does not substantially contain $Nb_2O_5$, and has a refractive index ($n_d$) of 1.82 to 1.86, an Abbe's number ($v_d$) of 37 to 44 and a glass transition point ($T_g$) of 630° C. or lower.

9 Claims, No Drawings

OPTICAL GLASS

FIELD OF THE INVENTION

The present invention relates to an optical glass having a high refractive index and a low dispersion property, a preform for precision press molding using the same, and an optical element using the same.

BACKGROUND OF THE INVENTION

Recently, since highly precise and compact digital cameras, camera-equipped mobile-phones, and the like have been popularized, demands for weight saving and miniaturization of optical systems have been rapidly increased. In order to meet these demands, an optical design using a highly functional glass aspheric lens becomes the mainstream. In particular, a large-aperture aspheric lens using a glass showing a high refractive index and a low dispersion characteristic is important for the optical design.

Moreover, as a process for producing an aspheric lens, a precision press molding method which does not require a polishing step becomes mainstream in view of productivity and production costs. The precision press molding method is roughly classified into a direct press method in which a molten glass is directly dropped into a mold and pressed as it is and a reheat press method in which a glass preform having predetermined mass and shape is formed by dropping or the like from a molten glass (hereinafter the step is referred to as glass preform molding) and the resulting glass preform is placed in a mold and subjected to reheating and press molding. In the latter reheat press method, press moldability is important but it is also important to make a high-precision glass preform (glass preform moldability).

As glasses showing a high refractive index and a low dispersion characteristic, glasses containing $B_2O_3$—$La_2O_3$ as main components are known. However, in these glasses, an improvement in chemical durability, devitrification resistance, or press moldability is emphasized, but the glass preform moldability, i.e., to have a low liquidus temperature and be less prone to devitrification (devitrification resistance), to have a proper viscosity for forming a predetermined shape (e.g., a viscosity at a liquidus temperature, hereinafter a liquidus temperature viscosity, of 5 to 15 dPa·s), and the like, is not always sufficient.

The glass preform for press molding is produced, as one example, by dropping a glass melt from a platinum nozzle having a diameter of several millimeters (1 to 10 mm). In order to produce such a glass preform precisely and homogeneously by hot molding, it is desirable that crystal bodies precipitating at a liquidus temperature or lower are single-species crystals.

A glass containing $B_2O_3$—$La_2O_3$ as main components sometimes produces a glass preform at around liquidus temperature in a mass production process. In that case, a part thereof is cooled to the liquidus temperature or lower and crystal bodies (devitrified substances) may sometimes precipitate. A glass melt is formed by melting the crystal bodies but, when a plurality kind of the crystal bodies exist, at the time when the crystal bodies are melted, the resulting glass melt has not always the same composition as that of the glass melt before the formation of the crystal bodies. Thus, the glass melt becomes heterogeneous, causing striae. Therefore, it is preferable that an optical glass for glass preform has a low liquidus temperature and crystal bodies precipitating at the liquidus temperature or lower are single-species crystals.

On the other hand, as optical glasses, lower press molding temperature results in more improved mold durability, shorter molding cycle and more increased productivity, so that a low press molding temperature is also required.

In order to solve the above problems, a glass containing $Li_2O$ in addition to $B_2O_3$ and $La_2O_3$ as main components is known but, since it contains a large amount of rare-earth elements such as $La_2O_3$, there is a problem that a stable glass is not obtained when it is intended to heighten the refractive index.

In order to solve the above problems, a glass containing $B_2O_3$—$SiO_2$—$La_2O_3$—$Gd_2O_3$—$ZnO$—$Li_2O$—$ZrO_2$ as main components has been proposed in Patent Document 1 but there is not specifically shown a composition of a high-refractive-index glass having a refractive index of 1.79 or more in Examples and, in addition, there is a problem that the molding temperature is high.

Furthermore, there have been proposed optical glasses for mold press molding containing $B_2O_3$—$SiO_2$—$La_2O_3$—$ZnO$—$Li_2O$—$ZrO_2$—$Ta_2O_5$ as main components and having $n_d$ of 1.84 or more, $\nu_d$ of 35 or more, and Tg of 630° C. or lower in Patent Documents 2, 3, and 4. However, in Examples of Patent Document 2, the liquidus temperature is not specifically shown and, in addition, a mol % fraction of the content of $La_2O_3$ to the total content of $La_2O_3$, $Gd_2O_3$, $Y_2O_3$, and $Yb_2O_3$ is 0.66 or less. Therefore, a plurality of crystal bodies precipitating at the liquidus temperature or lower precipitate, so that the optical glass is not always sufficient in view of the control of glass preform molding.

Moreover, the glasses of Patent Documents 3 and 4 excessively contains $Ta_2O_5$ and a plurality of crystal bodies precipitating at the liquidus temperature or lower precipitate, so that the glasses are not always sufficient in view of the control of glass preform moldability and, in addition, there is a problem in view of saving cost.

In addition to the above, the glass is preferably also excellent in chemical durability. Namely, when chemical durability is insufficient, there is a concern that a glass surface gets clouded only by washing the glass. The phenomenon that the glass surface gets clouded is called weathering of glass. The weathering which looks white is called white weathering and the weathering which looks blue is called blue weathering. In a glass having a high refractive index and a low dispersion property, the blue weathering sometimes becomes a problem. Moreover, when the chemical durability is insufficient, there is a concern that a mirror property is also decreased by grinding and polishing other than washing.

The chemical durability of the glass depends on the dissolution of light element ions such as alkali ions including a $B^{3+}$ ion, an $Li^+$ ion and alkaline earth ions including a $Zn^{2+}$ ion, so that a balance of the contents of respective components becomes important, with considering optical characteristics together.

Patent Document 1: JP-A-2003-201143
Patent Document 2: JP-A-2003-267748
Patent Document 3: JP-A-2006-016293
Patent Document 4: JP-A-2006-016295

SUMMARY OF THE INVENTION

An objective of the invention is to provide an optical glass having optical characteristics of a high refractive index and a low dispersion characteristic, less prone to devitrification, having an excellent preform moldability, and having a low molding temperature and an excellent press moldability.

The optical glass according to a first embodiment of the present invention is the optical glass contains, in terms of mass % on the basis of oxides, $B_2O_3$: 10 to 20%, $SiO_2$: 0.5 to 12%, ZnO: 5 to 19%, $Ta_2O_5$: 2.5 to 17%, $Li_2O$: 0.2 to 3%, $ZrO_2$: 0.6 to 4.9%, $WO_3$: 1 to 20%, $La_2O_3$: 25 to 50%, $Gd_2O_3$: 0 to 13%, and $Y_2O_3$: 0.2 to 20%, provided that $La_2O_3+Gd_2O_3+Y_2O_3$ is 35 to 60%, in which the optical glass does not substantially contain $Nb_2O_5$, and has a refractive index ($n_d$) of 1.82 to 1.86, an Abbe's number ($v_d$) of 37 to 44, and a glass transition point (Tg) of 630° C. or lower. In the present description, a lower limit of a numerical value means the numerical value or more and an upper limit of a numerical value means the numerical value or less unless otherwise indicated. For example, in the case of 1 to 2%, the lower limit 1% means 1% or more and the upper limit 2% means 2% or less, respectively.

The optical glass according to a second embodiment of the invention is the optical glass contains, in terms of mol % on the basis of oxides, $B_2O_3$: 20 to 40%, $SiO_2$: 1 to 30%, ZnO: 10 to 34%, $Ta_2O_5$: 0.8 to 8%, $Li_2O$: 0.5 to 15%, $ZrO_2$: 0.5 to 10%, $WO_3$: 3 to 15%, $La_2O_3$: 10 to 25%, $Gd_2O_3$: 0 to less than 5%, and $Y_2O_3$: 0.1 to 15%, provided that $La_2O_3+Gd_2O_3+Y_2O_3$ is 18 to 30%, in which the optical glass does not substantially contain $Nb_2O_5$, and has a refractive index ($n_d$) of 1.82 to 1.86, an Abbe's number ($v_d$) of 37 to 44, and a glass transition point ($T_g$) of 630° C. or lower.

The optical glass of the invention (hereinafter referred to as the present glass) has a high refractive index and has a refractive index $n_d$ toward the d line of 1.82 to 1.86 and an Abbe's number $v_d$ of 37 to 42.

The viscosity of the present glass at a liquidus temperature (hereinafter simply referred to as liquidus temperature viscosity) is preferably 5 dPa·s or more. When the liquidus temperature viscosity is within such a range, a preform having a predetermined shape is easily molded, and therefore, the glass does not require a time-consuming operation that a desired shape is formed by processing after it is once molded into a plate material as in the case of a low-viscosity optical glass, so that the glass is excellent in productivity.

Moreover, the present glass preferably has a liquidus temperature of 1130° C. or lower. When the liquidus temperature is within such a range, the glass is excellent in devitrification resistance and also crystals precipitating at the liquidus temperature or lower are single ones, so that the glass is excellent in preform molding control as a glass material in the aforementioned optical constant region.

Furthermore, since the present glass has a relatively small content of $Ta_2O_5$ among oxides of rare-earth elements as compared with the cases in known references of background art, a devitrified substance from a liquid phase is principally $LaBO_3$ alone, so that devitrification control is easy. Moreover, the glass is also excellent in chemical durability and thus surface cloudiness such as the blue weathering is not generated or is hardly generated by washing or the like.

DETAILED DESCRIPTION OF THE INVENTION

The reasons for setting the ranges of the respective components of the present glass will be described below.

In the present glass, $B_2O_3$ is a component which forms a glass skeleton and lowers liquidus temperature $T_L$ and is an essential component. In the present glass, the content of $B_2O_3$ is 10 to 20 mass %. When the content of $B_2O_3$ is less than 10 mass %, vitrification becomes difficult and thus the case is not preferred. In order to obtain a glass having a good devitrification resistance, the content of $B_2O_3$ is controlled to 10 mass % or more. The content of $B_2O_3$ is more preferably 11 mass % or more and further preferably 12 mass % or more. When the content of $B_2O_3$ is 12 mass % or more, the liquidus temperature decreases and also the Abbe's number can be increased, so that the case is particularly preferred.

On the other hand, in the present glass, when the content of $B_2O_3$ exceeds 20 mass %, there is a concern that the refractive index $n_d$ decreases or chemical durability such as water resistance deteriorates. In the present glass, the content of $B_2O_3$ is 20 mass % or less. In the case where it is intended to increase the refractive index $n_d$, the content of $B_2O_3$ is preferably 19.5 mass % or less and the content of $B_2O_3$ is more preferably 19 mass % or less. In this connection, the content of $B_2O_3$ is 20 to 40 mol % in terms of mol %.

The range of the content in terms of mol % and the range of the content in terms of mass % have not always mapping relation and there is a case where ranges which do not overlap each other may be present. In the invention, the ranges which overlap each other are the best ranges but, needless to say, the advantages of the invention are exhibited even in the ranges which do not overlap each other (the same shall apply hereinafter in the cases in terms of mol %).

In the present glass, $SiO_2$ is a component which is effective for stabilization of the glass and suppression of devitrification at high-temperature molding and is an essential component. In the present glass, the content of $SiO_2$ is 0.5 to 12 mass %. When the content of $SiO_2$ exceeds 12 mass %, there is a concern that the molding temperature becomes too high and the refractive index $n_d$ becomes too low. The content of $SiO_2$ is preferably 11 mass % or less and more preferably 10 mass % or less.

On the other hand, the devitrification at high-temperature molding can be suppressed or the viscosity can be adjusted by controlling the content of $SiO_2$ to 0.5 mass % or more. The content of $SiO_2$ is preferably 1 mass % or more and the content of $SiO_2$ is more preferably more than 2 mass %. In this connection, the content of $SiO_2$ is 1 to 30 mol % in terms of mol %.

In the present glass, ZnO is a component which stabilizes the glass and lowers the molding temperature and melting temperature and is an essential component. In the present glass, the content of ZnO is 5 to 19 mass %. When the content of ZnO is less than 5 mass %, there is a concern that the glass becomes unstable or the molding temperature rises. The content of ZnO is preferably 6 mass % or more and the content of ZnO of 6.5 mass % or more is further preferred. On the other hand, in the present glass, when the content of ZnO exceeds 19 mass %, the stability of the glass becomes worse and there is a concern of decrease in chemical durability. The content of ZnO is preferably 18 mass % or less and the content of ZnO is further preferably 17 mass % or less. In this connection, the content of ZnO is 10 to 34 mol % in terms of mol %.)

In the present glass, $Ta_2O_5$ is a component which stabilizes the glass, improves the refractive index $n_d$, and suppresses devitrification at molding from a melt and is an essential component. In the present glass, the content of $Ta_2O_5$ is 2.5 to 17 mass %. When the content of $Ta_2O_5$ is too small, there is a concern that the refractive index $n_d$ becomes too low and the liquidus temperature $T_L$ becomes too high. Therefore, the content of $Ta_2O_5$ is 2.5 mass % or more. The content of $Ta_2O_5$ is more preferably 5 mass % or more and further preferably 8 mass % or more.

On the other hand, when the content of $Ta_2O_5$ is too large, the melting temperature becomes high and the specific gravity becomes large. When the content of $Ta_2O_5$ is too large, crystals containing Ta (e.g., $LaTaO_7$, $LiTa_3O_7$) tend to precipitate at the liquidus temperature or lower and also, since $Ta_2O_5$ is a rare element and is an expensive component, its use leads to increase in cost. Therefore, in the present glass, the content of $Ta_2O_5$ is 17 mass % or less. The content of $Ta_2O_5$ is more preferably 15 mass % or less and further preferably 13 mass % or less. In this connection, the content of $Ta_2O_5$ is 0.8 to 8 mol % in terms of mol %. The content of $Ta_2O_5$ is preferably 1 mol % or more.

In the present glass, $Li_2O$ is a component which stabilizes the glass and lowers the precision press molding temperature and melting temperature and is an essential component. In the present glass, the content of $Li_2O$ is 0.2 to 3 mass %. When the content of $Li_2O$ is less than 0.2 mass %, there is a concern that the molding temperature becomes too high. The content of $Li_2O$ is preferably 0.3 mass % or more and the content of $Li_2O$ is further preferably 0.5 mass % or more.

On the other hand, when the content of $Li_2O$ exceeds 3 mass %, devitrification is apt to occur and there is a concern that chemical durability decreases and the component vigorously vaporizes at melting. The content of $Li_2O$ is preferably 2.5 mass % or less and the content of $Li_2O$ is further preferably 2 mass % or less. In this connection, the content of $Li_2O$ is 0.5 to 15 mol % in terms of mol %.

In the present glass, $ZrO_2$ is a component which stabilizes the glass, increases the refractive index $n_d$, and suppresses devitrification upon glass preform molding, and is an essential component. In the present glass, the content of $ZrO_2$ is 0.6 to 4.9%. When the content of $ZrO_2$ exceeds 4.9%, there is a concern that the molding temperature becomes too high or the Abbe's number becomes too small. Moreover, when the content of $ZrO_2$ exceeds 4.9%, there is also a concern that $ZrO_2$ tends to precipitate at the liquidus temperature or lower, the glass is not stabilized, and the liquidus temperature increases.

The content of $ZrO_2$ is more preferably 4.8% or less and the content of $ZrO_2$ is further preferably 4.7% or less. The content of $ZrO_2$ is particularly preferably 4.5% or less. In this connection, in the case where the glass transition point $T_g$ and the deformation point At are regarded as important, the content of $ZrO_2$ is preferably less than 2%. On the other hand, in order to obtain an effect of its addition, the content of $ZrO_2$ is preferably 0.8% or more and the content of $ZrO_2$ is further preferably 1.0% or more. For the same reasons, the content of $ZrO_2$ is particularly preferably 1.5% or more. In this connection, the content of $ZrO_2$ in the present glass is 0.5 to 10 mol %.

In the present glass, $WO_3$ is a component which is effective for stabilization of the glass, improvement of the refractive index $n_d$, and suppression of devitrification at high-temperature molding and is an essential component. In the present glass, the content of $WO_3$ is 1 to 20 mass %. When the content of $WO_3$ is less than 1 mass %, there is a concern that the refractive index $n_d$ decreases and the liquidus temperature $T_L$ rises. The content of $WO_3$ is preferably 5 mass % or more, the content of $WO_3$ is further preferably 7 mass % or more, and the content of $WO_3$ is particularly preferably 8 mass % or more. On the other hand, when the content of $WO_3$ exceeds 20 mass %, the Abbe's number becomes small and the objective low dispersion characteristic cannot be obtained. Therefore, the content of $WO_3$ is preferably 18 mass % or less and the content of $WO_3$ is further preferably 16 mass % or less. In this connection, the content of $WO_3$ is 3 to 15 mol % in terms of mol %.

In the present glass, $La_2O_3$ is a component which heightens the refractive index toward the d line (587.6 nm) (hereinafter referred to as refractive index $n_d$), increases the Abbe's number $v_d$, and improves chemical durability and is an essential component. In the present glass, the content of $La_2O_3$ is 25 to 50 mass %. When the content of $La_2O_3$ is less than 25 mass %, there is a concern that the refractive index $n_d$ becomes too low. The content of $La_2O_3$ is preferably 28 mass % or more and further preferably 30 mass % or more.

On the other hand, when the content of $La_2O_3$ exceeds 50 mass %, vitrification tends to be difficult and there is a concern that the molding temperature rises and the liquidus temperature $T_L$ rises. The content of $La_2O_3$ is preferably 48 mass % or less and more preferably 46 mass % or less. In this connection, the content of $La_2O_3$ is 10 to 25% in terms of mol %.

In the present glass, $Gd_2O_3$ is not an essential component but is a component which heightens the refractive index $n_d$, increases the Abbe's number $v_d$, and improves the stability of the glass by the simultaneous presence of $La_2O_3$. However, when $Gd_2O_3$ is introduced in a large amount, the liquidus temperature rises and also a crystal $Gd_2O_3$ precipitates other than $LaBO_3$ at the liquidus temperature or lower, so that there arises a problem in the control of preform moldability. Therefore, in the present glass, the content of $Gd_2O_3$ is limited to 0 to 13 mass %. In order to achieve a high refractive index and stabilize the glass, the content of $Gd_2O_3$ is preferably 1 mass % or more and the content of $Gd_2O_3$ is further preferably 2 mass % or more.

On the other hand, when the content of $Gd_2O_3$ exceeds 13 mass %, there is a concern that the liquidus temperature rises and $n_d$ decreases. Therefore, the content of $Gd_2O_3$ is preferably 12.5 mass % or less and more preferably 12 mass % or less. In this connection, the content of $Gd_2O_3$ is 0 to less than 5 mol % in terms of mol %.

Furthermore, in the present glass, when the total content of $Gd_2O_3$ and $Ta_2O_5$, $Gd_2O_3+Ta_2O_5$, is 30 mass % or less, the specific gravity of the optical glass can be reduced and the reduction contributes to weight saving of optical devices, so that the case is preferred. The above total content is preferably 25 mass % or less, more preferably 23 mass % or less, and further preferably 20 mass % or less. For the same reason, $Gd_2O_3+Ta_2O_5$ is preferably 10 mol % or less.

In the present glass, $Y_2O_3$ is a component which heightens the refractive index $n_d$, increases the Abbe's number $v_d$, and improves the chemical durability as in the cases of $La_2O_3$ and $Gd_2O_3$. Furthermore, $Y_2O_3$ is also a component which stabilizes the glass and also increases the viscosity as compared with the oxides of the other rare-earth elements. In the present glass, the content of $Y_2O_3$ is 0.2 to 20 mass % and it is an essential component.

The content of $Y_2O_3$ is preferably 0.5 mass % or more and the content of $Y_2O_3$ is further preferably 1 mass % or more. On the other hand, when the content of $Y_2O_3$ exceeds 20 mass %, there is a concern that the liquidus temperature rises and $n_d$ lowers. Therefore, the content of $Y_2O_3$ is preferably 18 mass % or less and further preferably 15 mass % or less. In this connection, the content of $Y_2O_3$ is 0.1 to 15 mol % in terms of mol %.

In the present glass, the total content of $La_2O_3$, $Gd_2O_3$, and $Y_2O_3$ is 35 to 60 mass %. When the total content is less than 35 mass %, there is a concern that the refractive index $n_d$ lowers or the chemical durability decreases. The total content is preferably 40 mass % or more, further preferably 41 mass % or more, and especially preferably 43 mass % or more. On the other hand, when the total content exceeds 60 mass %, vitrification tends to be difficult and there is a concern that the molding temperature rises and the liquidus temperature $T_L$ rises. The total content is preferably 58 mass % or less and the total content is further preferably 55 mass % or less. In this connection, the total content of $La_2O_3$, $Gd_2O_3$, and $Y_2O_3$ is 15 to 30 mol % in terms of mol %.

In the present glass, when a fraction calculated by dividing the content of $La_2O_3$ by the total content of $La_2O_3$, $Gd_2O_3$, $Y_2O_3$, and $Yb_2O_3$ (hereinafter the fraction is referred to as a lanthanum ratio) is preferably 0.67 to 0.90 in terms of mass %. When three components of $La_2O_3$, $Gd_2O_3$, and $Y_2O_3$ are all contained and the content of $Ta_2O_5$ is 15.5% or less, a crystalline phase precipitating at the liquidus temperature or lower becomes $LaBO_3$ alone.

In that case, as the glass material in the aforementioned optical constant region, in addition to the excellent preform molding control, since the crystal growth rate of $LaBO_3$ is low, the production temperature can be lowered by 20° C. from the liquidus temperature by precipitating the crystal principally solely, and productivity is improved, so that the case is preferred. For the same reason, the lanthanum ratio is preferably 0.67 to 0.90 in terms of mol %.

Since there is a concern that the Abbe's number $v_d$ becomes too small or the liquidus temperature becomes high, the present glass does not substantially contain $Nb_2O_5$. In the present description, the term "does not substantially contain" means that $Nb_2O_5$ is not intentionally added and does not exclude the case where the compound is contained a s unavoidable impurities.

$TiO_2$ is a component which is effective for stabilization of the glass, improvement of the refractive index, and the like. However, on the other hand, it is a component which is relatively easily devitrified, so that it is preferred that the present glass does not substantially contain $TiO_2$.

In the present glass, $Yb_2O_3$ is not an essential component but the glass may contain $Yb_2O_3$ in a content of 0 to 10 mass % for the purpose of improvement of the refractive index $n_d$, suppression of devitrification at high-temperature molding, and the like. When the content exceeds 10 mass %, there is a concern that the glass becomes unstable, the molding temperature becomes too high, and the specific gravity becomes too large. Therefore, the content of $Yb_2O_3$ is preferably 5 mass % or less, and more preferably, the glass does not contain $Yb_2O_3$.

In the present glass, $Al_2O_3$, $Ga_2O_3$, and $GeO_2$ all are not essential components but the glass may contain each component in a content of 0 to 10 mass % for the purpose of stabilization of the glass, adjustment of the refractive index $n_d$, and the like. When the content of $Al_2O_3$, $Ga_2O_3$, or $GeO_2$ exceeds 10 mass %, there is a concern that the Abbe's number $v_d$ becomes too low. The content of $Al_2O_3$, $Ga_2O_3$, or $GeO_2$ is more preferably 8 mass % or less and further preferably 6 mass % or less. Moreover, since $Ga_2O_3$ and $GeO_2$ are very rare and expensive components, the glass does not desirably contain them. In this connection, the content of each of $Al_2O_3$, $Ga_2O_3$, and $GeO_2$ is 0 to 8 mol % in terms of mol %.

In the present glass, BaO, SrO, CaO, and MgO all are not essential components but the glass may contain each component in a content of 0 to 15 mass % for the purpose of stabilization of the glass, increase in the Abbe's number $v_d$, lowering of the molding temperature, decrease in the specific gravity, and the like. When the content of each of BaO, SrO, CaO, and MgO exceeds 15 mass %, there is a concern that the glass becomes unstable or the refractive index $n_d$ lowers.

Moreover, for the purpose of further stabilization of the glass, adjustment of the refractive index $n_d$, adjustment of the specific gravity, lowering of the melting temperature, and the like, the glass may contain each component of $Na_2O$, $K_2O$, $Rb_2O$, or $Cs_2O$ in a total content of 0 to 5 mass %. When the total content of each component of $Na_2O$, $K_2O$, $Rb_2O$, or $Cs_2O$ exceeds 5 mass %, there is a concern that the glass becomes unstable, the refractive index $n_d$ lowers, the hardness decreases, or the chemical durability decreases. In this connection, in the case where the hardness and the chemical durability are regarded as important, it is preferred that the glass does not substantially contain any component of $Na_2O$, $K_2O$, $Rb_2O$, or $Cs_2O$. In this connection, the content of each component of $Na_2O$, $K_2O$, $Rb_2O$, or $Cs_2O$ is 0 to 5 mol % in terms of mol %.

In the present glass, optional components other than the above components can be selected depending on individual required characteristics. For example, in the case where a high refractive index $n_d$ and a low glass transition point $T_g$ are regarded as important, the glass may contain SnO in a content of 0 to 4 mass % (0 to 4 mol %). Similarly, in the case where a high refractive index is regarded as important, the glass may contain $TeO_2$ and/or $Bi_2O_3$ in a single or total content of 0 to 6 mass %. When the content of $TeO_2$ and/or $Bi_2O_3$ exceeds 6 mass %, there is a concern that the glass becomes unstable or the transmittance remarkably decreases. However, in the case where it is intended to increase the Abbe's number $v_d$, it is preferred that the glass does not substantially contain any of $TeO_2$ or $Bi_2O_3$. In this connection, the single or total content of $TeO_2$ and/or $Bi_2O_3$ is 0 to 10 mol % in terms of mol %.

For the purpose of refining and the like, the present glass may contain $Sb_2O_3$ in a content of 0 to 1 mass % (0 to 1 mol %). In this connection, the content of $Sb_2O_3$ is 0 to 1 mol % in terms of mol %.

The present glass essentially consists of the above components but may contain the other components within the range where the purposes of the invention are not impaired. In the case where the glass contains such components, the sum of contents of the components is preferably 10 mass % (10 mol %) or less, more preferably 8 mass % (8 mol %) or less, and further preferably 6 mass % (6 mol %) or less or 5 mass % (5 mol %) or less. In this connection, the total content of the other components is, as mentioned above, preferably 10 mol % or less, more preferably 8 mol % or less, and further preferably 6 mol % or less or 5 mol % or less in terms of mol %.

In the present glass, in order to reduce the burden on the environment, it is preferred that the glass does not substantially contain any of lead (PbO), arsine ($As_2O_3$), thallium ($Tl_2O$), thorium ($ThO_2$), and cadmium (CdO). Moreover, when the glass contains fluorine, since it increases thermal expansion coefficient and adversely affects releasing ability and molding ability and also the component is easily vaporized, the composition of the optical glass tends to be heterogeneous at the melting of the glass and there is a problem that durability of the mold such as a releasing film is decreased at precision mold-molding, so that the present glass also preferably does not substantially contain fluorine.

In the present glass, for the reasons of prevention of coloring and the like, it is preferred that the glass does not substantially contain transition metal compounds including $Fe_2O_3$ as a representative. Even in the case where the compounds are inevitably incorporated from raw materials, the total content of the transition metal compounds in the present glass is preferably 0.01 mass % or less.

As optical characteristics of the present glass, the refractive index $n_d$ is 1.82 to 1.86. When the refractive index $n_d$ is 1.83 or more, the glass is suitable for miniaturization and decrease in thickness of lenses, so that the case is preferred. The refractive index $n_d$ of 1.84 or more is particularly preferred for miniaturization and decrease in a thickness of lenses. On the other hand, when the refractive index $n_d$ of the present glass exceeds 1.86, the Abbe's number becomes too small and also the other thermal physical properties are adversely affected, so that the case is not preferred. The refractive index $n_d$ of the present glass is preferably 1.855 or less. In this connection, when the chemical durability is regarded as important, the refractive index $n_d$ of 1.82 to 1.83 is preferred in view of a balance of characteristics.

The Abbe's number $v_d$ of the present glass is 37 to 44. When the Abbe's number $v_c$ is 37 or more, the glass has a low dispersion characteristic. Moreover, when the Abbe's number $v_d$ is 44 or less, the glass has a good devitrification resistance. In this connection, when the chemical durability is regarded as important, the Abbe's number $v_d$ of 42 to 44 is preferred in view of a balance of characteristics.

When the glass transition point $T_g$ is 630° C. or lower, the deterioration of the mold at precision press molding hardly occurs. The glass transition temperature $T_g$ is preferably 525° C. or lower and more preferably 620° C. or lower.

The deformation point At of the present glass is preferably 680° C. or lower since the deterioration of the mold is less prone to occur. The deformation point At is more preferably 675° C. or lower and especially preferably 670° C. or lower.

The specific gravity of the present glass is preferably 5.3 or less. When it exceeds 5.3, in the case where the glass is used as an optical element such as an optical lens, the weight of the optical system becomes too large and thus there is a possibility that the driving system of the lens bears a burden. Therefore, the specific gravity is desirably 5.3 or less and the specific gravity is more preferably 5.25 or less. A specific gravity of 5.2 or less is further preferred.

The liquidus temperature $T_L$ of the present glass is preferably 1130° C. or lower. When the liquidus temperature $T_L$ exceeds 1130° C., the molded article tends to be devitrified at high-temperature molding and the carbon and heat-resistant alloy to be used as a receiving mold at high-temperature molding are deteriorated, so that the case is not preferred. The liquidus temperature $T_L$ of the present glass is more preferably 1100° C. or lower, and further preferably 1080° C. or lower. In this connection, the liquidus temperature $T_L$ is defined as a maximum temperature where no crystals are formed from a glass melt in the case where the glass melt is kept at the temperature for 1 hour.

When the liquidus temperature viscosity $\eta_{TL}$ of the present glass is 5 dPa·s or more, the preform moldability is excellent, so that the case is preferred. The liquidus temperature viscosity $\eta_{TL}$ is further preferably 7 dPa·s or more and the liquidus temperature viscosity $\eta_{TL}$ is particularly preferably 8 dPa·s or more.

Since the present glass has such characteristics as mentioned above, an optical design is easily performed and the glass is suitable for optical elements, particularly a glass molded aspheric lens to be used in digital still cameras and the like.

EXAMPLES

The following will explain specific embodiments of the invention with reference to Working Examples (Examples 1 to 15, Examples 20 to 37) but the invention is not limited thereto. Examples 16 and 17 are glass compositions described in Working Examples 44 and 49 of Patent Document 2 cited in Background Art. Example 18 is Working Example 13 of Patent Document 3. Example 19 is Working Example 5 of Patent Document 4 and also Working Example 25 of Patent Document 3. Incidentally, in Examples 16 and 18, vitrification was not achieved and hence optical constants and the like could not be measured, so that [—] is described in corresponding sections.

As a method for preparing a raw material, the following raw materials were blended so as to obtain a glass having a composition shown in the table, placed in a platinum crucible, and melted at 1250 to 1450° C. for 2 hours. On this occasion, the whole was, stirred with a platinum stirrer for 0.5 hour to homogenize the molten glass. After the homogenized molten glass was drawn off to form a plate, it was maintained at a temperature of $T_g+10°$ C. for 4 hours and then gradually cooled to room temperature at a cooling rate of −1° C./min. The shape of the manufactured glass sample has a length of 40 mm, a width of 40 mm, and a thickness of 10 mm. Moreover, in the evaluation of physical properties, the glass sample was cut and subjected to evaluation.

As the raw materials, special grade reagents manufactured by Kanto Chemical Co., Ltd. were used for boric acid, lithium carbonate, zinc oxide, titanium oxide and zirconium dioxide. For lanthanum oxide, yttrium oxide, and gadolinium oxide, reagents having a purity of 99.9% manufactured by Shin-Etsu Chemical Co., Ltd. were employed. For tantalum oxide, silicon dioxide, and tungsten oxide, reagents having a purity of 99.9% or more manufactured by Kojundo Chemical Laboratory Co., Ltd. were used. For tellurium oxide, reagent having a purity of 99.9% or more manufactured by Sojitz Chemical Corporation was used.

With regard to the glass obtained, a refractive index $n_d$ at wavelength 587.6 nm (d line), a refractive index $n_c$ at wavelength 656.3 nm (C line), a refractive index $n_F$ at wavelength 486.1 nm (F line), an Abbe's number $v_d$, a glass transition point $T_g$ (unit: ° C.), a deformation point At (unit: ° C.), liquidus temperature $T_L$ (unit: ° C.), a crystalline phase precipitating at the liquidus temperature or lower, and specific gravity d were measured. The measurement methods thereof are described below.

Thermal characteristics (glass transition point $T_g$, deformation point At): A sample processed into a cylindrical shape having a diameter of 5 mm and a length of 20 mm was measured with a thermometric apparatus (manufactured by Bruker AXS, trade name: TD5000SA) at a temperature-elevating rate of 5° C./minute.

Optical constants (refractive index $n_d$, Abbe's number $v_d$): A sample processed into a rectangular shape having a side length of 20 mm and a thickness of 10 mm was measured with a precision refractometer (manufactured by Kalnew Optical Industries, trade name: KPR-2). The Abbe's number $v_d$ was determined according to the equation: $\{(n_d-1)/(n_F-n_c)\}$.

Liquidus temperature $T_L$: A glass processed into a cubic shape having a side length of 10 mm was placed on a platinum dish and allowed to stand in an electric furnace set at a constant temperature for 1 hour. Then, the glass taken out of the furnace was observed under an optical microscope of 100 magnifications, and the maximum temperature where no precipitation of crystals was observed was taken as the liquidus temperature $T_L$. Crystalline phase precipitating at liquidus temperature $T_L$ or lower: A glass processed into a cubic shape having a side length of 10 mm was placed on a platinum dish and allowed to stand in an electric furnace set at a temperature lower than the liquidus temperature by 20 to 50° C. for 1 hour. Then, the glass taken out of the furnace was pulverized in an alumina mortar and a crystalline phase was identified with an X-ray diffractometer (manufactured by Rigaku Corporation, trade name: RINT2500).

Liquidus temperature viscosity $\eta_{TL}$: The viscosity was measured in accordance with JIS Standard Z8803 (a method for measuring viscosity with a coaxial double cylindrical rotary viscometer). Specifically, 85 cm³ of a glass was placed in a platinum crucible having a diameter of 40 mm, a platinum rotor was immersed into the glass melt, and torque values were measured with lowering the temperature from 1350° C. to 900° C. at −60° C./hr, thereby determining viscosity.

Specific gravity d: A glass cut so as to have about 20 g was subjected to measurement by the Archimedes method using water with a specific gravity meter (manufactured by Shimadzu Corporation, trade name: SGM 300P).

Chemical durability: The durability is evaluated with water resistance and acid resistance. The water resistance means a degree of dissolution of the optical glass toward water and the acid resistance means a degree of dissolution toward an acid. In the present description, the durability was measured in accordance with "Measurement Method of Chemical Durability of Optical Glass (Powder Method)" of Japan Optical Glass Industry Standard. Specifically, an optical glass was pulverized in a mortar and sieved with sieves each having an opening of 710 μm, 600 μm, or 425 μm and a glass powder remained on the sieve having an opening of 425 μm was used as a sample. The glass powder weighed was placed in a Pt dissolution basket (an opening of 177 to 210 μm) and it was immersed in a round-bottom flask containing 0.01 mol/l nitric acid or ion-exchange water. Furthermore, the round-bottom flask was immersed in a boiling beaker and kept for 60 minutes. After keeping, the glass powder was dried and then weighed and a mass reduction ratio was calculated. The operation was repeated three times and an average value was determined. Based on the values of the mass reduction ratio, the water resistance and the acid resistance were evaluated by grade ranking.

With regard to the evaluation of the water resistance, a mass reduction ratio of less than 0.05% is ranked as first grade, a mass reduction ratio of at least 0.05% to less than 0.10% is ranked as second grade, a mass reduction ratio of at least 0.10% to less than 0.25% is ranked as third grade, and a mass reduction ratio of at least 0.25% to less than 0.60% is ranked as fourth grade. With regard to the evaluation of the acid resistance, a mass reduction ratio of less than 0.20% is ranked as first grade, a mass reduction ratio of at least 0.20% to less than 0.35% is ranked as second grade, a mass reduction ratio of at least 0.35% to less than 0.65% is ranked as third grade, and a mass reduction ratio of at least 0.65% to less than 1.20% is ranked as fourth grade.

The measurement and calculation results are shown in tables below. In Tables 1 to 6, Examples of the invention are designated in terms of mass %. Also, in Tables 7 to 12, Examples of the invention are designated in terms of mol %. Incidentally, in the tables, the total content of $La_2O_3+Gd_2O_3+Y_2O_3$ is simply referred to as La+Gd+Y and the total content of $Gd_2O_3+Ta_2O_5$ is simply referred to as Gd+Ta. Also, a section existing no measured value is designated by "–".

TABLE 1

| mass % | Example 1 | Example 2 | Example 3 | Example 4 | Example 5 | Example 6 | Example 7 |
|---|---|---|---|---|---|---|---|
| $B_2O_3$ | 13.7 | 13.8 | 14.2 | 13.5 | 14.1 | 12.3 | 12.9 |
| $SiO_2$ | 5.0 | 5.0 | 5.2 | 5.6 | 5.1 | 7.5 | 6.9 |
| ZnO | 9.9 | 9.9 | 10.2 | 10.8 | 10.1 | 9.9 | 9.0 |
| $Ta_2O_5$ | 10.5 | 10.6 | 10.9 | 10.8 | 10.8 | 9.4 | 9.4 |
| $Li_2O$ | 0.4 | 0.5 | 0.5 | 0.5 | 0.5 | 0.4 | 0.4 |
| $ZrO_2$ | 1.3 | 2.6 | 2.6 | 3.1 | 2.6 | 3.8 | 4.5 |
| $WO_3$ | 10.6 | 10.6 | 11.0 | 9.4 | 10.8 | 9.4 | 9.4 |
| $La_2O_3$ | 34.8 | 33.2 | 36.0 | 33.4 | 39.1 | 34.8 | 34.8 |
| $Gd_2O_3$ | 9.6 | 10.0 | 0.0 | 10.0 | 0.0 | 9.6 | 9.6 |
| $Y_2O_3$ | 4.2 | 4.0 | 9.3 | 2.8 | 6.8 | 3.0 | 3.0 |
| $Nb_2O_5$ | 0.0 | 0.0 | 0.0 | 0.0 | 0.0 | 0.0 | 0.0 |
| La + Gd + Y | 48.6 | 47.2 | 45.3 | 46.2 | 45.9 | 47.4 | 47.4 |
| Gd + Ta | 20.1 | 20.6 | 20.2 | 13.6 | 17.6 | 19.0 | 19.0 |
| Lanthanum ratio | 0.72 | 0.70 | 0.79 | 0.72 | 0.85 | 0.73 | 0.73 |
| $n_d$ | 1.8513 | 1.8530 | 1.8490 | 1.8496 | 1.8517 | 1.8471 | 1.8496 |
| $v_d$ | 39.9 | 39.7 | 39.8 | 40.0 | 39.7 | 40.2 | 40.2 |
| $T_g/°C$ | 612 | 614 | 612 | 611 | 615 | 626 | 628 |
| $At/°C$ | 663 | 664 | 658 | 659 | 663 | 669 | 678 |
| $T_L/°C$ | 1090 | 1080 | 1090 | 1060 | 1080 | 1070 | 1080 |
| d | 5.24 | 5.24 | 5.07 | 5.21 | 5.10 | 5.17 | 5.17 |
| $\eta_{TL}/dPa \cdot s$ | 6 | 7 | 6 | 9 | 7 | 11 | 8 |
| Water resistance/grade | — | — | — | — | — | 1 | 1 |
| Acid resistance/grade | — | — | — | — | — | 2 | 3 |

TABLE 2

| mass % | Example 8 | Example 9 | Example 10 | Example 11 | Example 12 | Example 13 | Example 14 |
|---|---|---|---|---|---|---|---|
| $B_2O_3$ | 12.6 | 12.2 | 12.7 | 14.2 | 13.4 | 14.4 | 13.9 |
| $SiO_2$ | 6.8 | 6.8 | 6.8 | 5.4 | 6.4 | 5.1 | 5.3 |
| ZnO | 8.9 | 9.8 | 9.9 | 8.6 | 6.9 | 10.2 | 9.9 |
| $Ta_2O_5$ | 9.3 | 9.3 | 9.4 | 15.2 | 9.7 | 11.0 | 13.8 |
| $Li_2O$ | 0.4 | 0.4 | 0.4 | 0.7 | 1.1 | 0.5 | 0.4 |
| $ZrO_2$ | 3.8 | 3.8 | 3.8 | 2.6 | 3.9 | 2.7 | 2.6 |
| $WO_3$ | 9.3 | 9.3 | 9.4 | 6.1 | 9.6 | 11.0 | 10.6 |
| $La_2O_3$ | 34.5 | 34.6 | 35.6 | 35.4 | 36.6 | 34.2 | 37.2 |
| $Gd_2O_3$ | 11.4 | 9.5 | 9.6 | 10.1 | 9.8 | 0.0 | 4.7 |
| $Y_2O_3$ | 3.0 | 4.2 | 2.5 | 1.7 | 2.5 | 10.9 | 1.6 |
| $Nb_2O_5$ | 0.0 | 0.0 | 0.0 | 0.0 | 0.0 | 0.0 | 0.0 |
| La + Gd + Y | 48.9 | 48.3 | 47.7 | 47.2 | 48.9 | 45.1 | 43.5 |
| Gd + Ta | 20.7 | 18.8 | 19.0 | 25.3 | 19.5 | 11.0 | 18.5 |
| Lanthanum ratio | 0.71 | 0.72 | 0.75 | 0.75 | 0.75 | 0.76 | 0.85 |
| $n_d$ | 1.8510 | 1.8530 | 1.8498 | 1.8518 | 1.8483 | 1.8477 | 1.8535 |
| $v_d$ | 40.2 | 40.1 | 40.1 | 40.1 | 40.6 | 40.0 | 39.2 |
| $T_g/°C$ | 630 | 625 | 621 | 610 | 600 | 611 | 610 |
| $At/°C$ | 678 | 670 | 669 | 660 | 648 | 660 | 658 |

TABLE 2-continued

| mass % | Example 8 | Example 9 | Example 10 | Example 11 | Example 12 | Example 13 | Example 14 |
|---|---|---|---|---|---|---|---|
| $T_L/°C$ | 1070 | 1070 | 1050 | 1080 | 1080 | 1100 | 1060 |
| d | 5.22 | 5.21 | 5.17 | 5.18 | 5.12 | 5.01 | 5.19 |
| $\eta_{TL}/dPa \cdot s$ | 10 | 10 | 13 | 7 | 7 | 5 | 9 |
| Water resistance/grade | 1 | 1 | 1 | — | — | — | — |
| Acid resistance/grade | 3 | 3 | 3 | — | — | — | — |

TABLE 3

| mass % | Example 15 | Example 16 | Example 17 | Example 18 | Example 19 | Example 20 | Example 21 |
|---|---|---|---|---|---|---|---|
| $B_2O_3$ | 13.2 | 10.4 | 11.1 | 9.9 | 15.5 | 15.5 | 15.0 |
| $SiO_2$ | 5.5 | 6.0 | 6.2 | 6.0 | 5.4 | 6.7 | 6.7 |
| ZnO | 9.8 | 4.9 | 5.0 | 4.5 | 5.4 | 10.9 | 10.8 |
| $Ta_2O_5$ | 12.5 | 9.9 | 10.2 | 16.7 | 18.5 | 5.2 | 5.1 |
| $Li_2O$ | 0.4 | 1.6 | 1.7 | 1.5 | 1.0 | 0.5 | 0.5 |
| $ZrO_2$ | 2.5 | 3.1 | 2.5 | 6.0 | 6.0 | 2.9 | 4.2 |
| $WO_3$ | 10.0 | 9.3 | 8.4 | 7.0 | 1.5 | 6.5 | 6.4 |
| $La_2O_3$ | 34.4 | 30.9 | 31.9 | 38.5 | 37.6 | 39.0 | 38.6 |
| $Gd_2O_3$ | 9.3 | 20.0 | 20.5 | 15.8 | 7.0 | 9.7 | 9.6 |
| $Y_2O_3$ | 2.3 | 3.9 | 2.3 | 0.0 | 0.0 | 3.0 | 3.0 |
| $Nb_2O_5$ | 0.0 | 0.0 | 0.0 | 1.0 | 2.0 | 0.0 | 0.0 |
| La + Gd + Y | 46.0 | 54.8 | 54.7 | 54.3 | 44.6 | 51.8 | 51.3 |
| Gd + Ta | 21.8 | 29.9 | 30.7 | 32.5 | 25.5 | 14.9 | 14.8 |
| Lanthanum ratio | 0.75 | 0.56 | 0.58 | 0.71 | 0.84 | 0.75 | 0.75 |
| $n_d$ | 1.8548 | — | 1.8494 | — | 1.8523 | 1.8226 | 1.8299 |
| $v_d$ | 39.4 | — | 40.2 | — | 40.6 | 43.0 | 42.5 |
| $T_g/°C$ | 610 | — | 605 | — | 613 | 613 | 612 |
| At/°C | 660 | — | 659 | — | 663 | 658 | 659 |
| $T_L/°C$ | 1060 | — | 1200 | — | 1110 | 1100 | 1120 |
| d | 5.24 | — | 5.36 | — | 5.07 | 4.96 | 5.00 |
| $\eta_{TL}/dPa \cdot s$ | 9 | — | 2 | — | 7 | 6 | 5 |
| Water resistance/grade | — | — | — | — | — | — | 1 |
| Acid resistance/grade | — | — | — | — | — | — | 2 |

TABLE 4

| mass % | Example 22 | Example 23 | Example 24 | Example 25 | Example 26 | Example 27 | Example 28 |
|---|---|---|---|---|---|---|---|
| $B_2O_3$ | 15.7 | 15.4 | 15.3 | 15.5 | 15.6 | 15.4 | 15.5 |
| $SiO_2$ | 6.8 | 6.7 | 6.6 | 6.7 | 6.7 | 6.7 | 6.7 |
| ZnO | 11.0 | 10.8 | 12.6 | 10.9 | 11.0 | 10.9 | 10.9 |
| $Ta_2O_5$ | 2.7 | 5.1 | 5.1 | 5.2 | 5.2 | 7.6 | 7.6 |
| $Li_2O$ | 0.5 | 0.5 | 0.2 | 0.5 | 0.5 | 0.5 | 0.5 |
| $ZrO_2$ | 4.3 | 2.9 | 2.9 | 2.9 | 2.9 | 2.9 | 4.3 |
| $WO_3$ | 6.6 | 6.4 | 6.4 | 6.5 | 6.5 | 6.4 | 6.5 |
| $La_2O_3$ | 39.4 | 38.7 | 38.4 | 37.1 | 35.5 | 36.9 | 35.3 |
| $Gd_2O_3$ | 9.8 | 9.6 | 9.6 | 11.7 | 11.8 | 9.7 | 9.7 |
| $Y_2O_3$ | 3.1 | 3.0 | 3.0 | 3.0 | 4.3 | 3.0 | 3.0 |
| $Nb_2O_5$ | 0.0 | 0.0 | 0.0 | 0.0 | 0.0 | 0.0 | 0.0 |
| $TiO_2$ | 0.0 | 0.9 | 0.0 | 0.0 | 0.0 | 0.0 | 0.0 |
| La + Gd + Y | 52.3 | 51.3 | 51.0 | 51.9 | 51.6 | 49.6 | 48.0 |
| Gd + Ta | 12.6 | 14.8 | 14.7 | 16.9 | 17.0 | 17.3 | 17.4 |
| Lanthanum ratio | 0.75 | 0.75 | 0.75 | 0.72 | 0.69 | 0.74 | 0.73 |
| $n_d$ | 1.8221 | 1.8279 | 1.8254 | 1.8222 | 1.8213 | 1.8252 | 1.8247 |
| $v_d$ | 43.3 | 42.0 | 42.7 | 43.2 | 43.2 | 42.7 | 42.4 |
| $T_g/°C$ | 613 | 613 | 623 | 612 | 612 | 611 | 613 |
| At/°C | 658 | 657 | 666 | 653 | 658 | 658 | 657 |
| $T_L/°C$ | 1120 | 1110 | 1120 | 1120 | 1120 | 1100 | 1080 |
| d | 4.92 | 4.94 | 5.00 | 4.98 | 4.97 | 4.99 | 4.96 |
| $\eta_{TL}/dPa \cdot s$ | 5 | 5 | 5 | 5 | 5 | 6 | 7 |
| Water resistance/grade | — | — | 1 | — | — | — | — |
| Acid resistance/grade | — | — | 1 | — | — | — | — |

TABLE 5

| mass % | Example 29 | Example 30 | Example 31 | Example 32 | Example 33 | Example 34 | Example 35 |
|---|---|---|---|---|---|---|---|
| $B_2O_3$ | 15.2 | 15.4 | 14.5 | 14.5 | 16.3 | 15.5 | 16.4 |
| $SiO_2$ | 6.6 | 6.7 | 8.0 | 8.0 | 5.4 | 6.7 | 5.4 |
| ZnO | 10.7 | 10.9 | 10.8 | 10.8 | 11.0 | 11.0 | 11.0 |
| $Ta_2O_5$ | 12.4 | 5.2 | 7.6 | 7.6 | 7.7 | 5.2 | 5.2 |
| $Li_2O$ | 0.5 | 0.5 | 0.5 | 0.5 | 0.5 | 0.5 | 0.5 |
| $ZrO_2$ | 2.8 | 2.9 | 2.9 | 2.9 | 4.3 | 4.3 | 4.3 |
| $WO_3$ | 6.4 | 6.5 | 6.4 | 6.4 | 6.5 | 6.5 | 6.5 |
| $La_2O_3$ | 32.9 | 38.9 | 36.7 | 34.9 | 35.5 | 35.4 | 35.6 |
| $Gd_2O_3$ | 9.5 | 9.7 | 9.6 | 11.6 | 9.8 | 11.8 | 11.9 |
| $Y_2O_3$ | 3.0 | 3.0 | 3.0 | 3.0 | 3.0 | 3.0 | 3.1 |
| $Nb_2O_5$ | 0.0 | 0.0 | 0.0 | 0.0 | 0.0 | 0.0 | 0.0 |
| $TeO_2$ | 0.0 | 0.4 | 0.0 | 0.0 | 0.0 | 0.0 | 0.0 |
| La + Gd + Y | 45.4 | 51.6 | 49.4 | 49.5 | 48.3 | 50.3 | 50.6 |
| Gd + Ta | 21.9 | 14.9 | 17.2 | 19.2 | 17.5 | 17.0 | 17.1 |
| Lanthanum ratio | 0.72 | 0.75 | 0.74 | 0.71 | 0.73 | 0.71 | 0.71 |
| $n_d$ | 1.8273 | 1.8226 | 1.8205 | 1.8206 | 1.8279 | 1.8238 | 1.8262 |
| $v_d$ | 42.0 | 43.0 | 42.9 | 42.8 | 42.2 | 42.8 | 42.6 |
| $T_g$/° C. | 611 | 609 | 613 | 616 | 610 | 615 | 611 |
| At/° C. | 658 | 654 | 661 | 663 | 654 | 659 | 653 |
| $T_L$/° C. | 1030 | 1120 | 1070 | 1060 | 1080 | 1100 | 1110 |
| d | 5.02 | 4.97 | 4.97 | 4.99 | 4.98 | 4.97 | 4.99 |
| $\eta_{TL}$/dPa·s | 15 | 5 | 9 | 10 | 7 | 6 | 5 |
| Water resistance/grade | — | — | 1 | 1 | — | — | — |
| Acid resistance/grade | — | — | 1 | 1 | — | — | — |

TABLE 6

| mass % | Example 36 | Example 37 |
|---|---|---|
| $B_2O_3$ | 18.8 | 18.7 |
| $SiO_2$ | 3.5 | 4.2 |
| ZnO | 10.5 | 10.9 |
| $Ta_2O_5$ | 10.4 | 10.3 |
| $Li_2O$ | 0.9 | 0.6 |
| $ZrO_2$ | 4.3 | 4.3 |
| $WO_3$ | 5.5 | 5.4 |
| $La_2O_3$ | 32.1 | 31.0 |
| $Gd_2O_3$ | 12.5 | 12.2 |
| $Y_2O_3$ | 1.5 | 2.2 |
| $Nb_2O_5$ | 0.0 | 0.0 |
| $TeO_2$ | 0.0 | 0.0 |
| La + Gd + Y | 46.1 | 45.5 |
| Gd + Ta | 22.9 | 22.6 |
| Lanthanum ratio | 0.70 | 0.68 |
| $n_d$ | 1.8227 | 1.8207 |
| $v_d$ | 42.7 | 42.7 |
| $T_g$/° C. | 596 | 608 |
| At/° C. | 636 | 658 |
| $T_L$/° C. | 1040 | 1010 |
| d | 4.96 | 4.94 |
| $\eta_{TL}$/dPa·s | 8 | 12 |
| Water resistance/grade | — | — |
| Acid resistance/grade | — | — |

TABLE 7

| mol % | Example 1 | Example 2 | Example 3 | Example 4 | Example 5 | Example 6 | Example 7 |
|---|---|---|---|---|---|---|---|
| $B_2O_3$ | 30.5 | 30.2 | 30.2 | 29.0 | 30.2 | 26.1 | 27.6 |
| $SiO_2$ | 12.8 | 12.7 | 12.7 | 14.1 | 12.7 | 18.4 | 17.0 |
| ZnO | 18.7 | 18.6 | 18.6 | 19.8 | 18.6 | 17.9 | 16.6 |
| $Ta_2O_5$ | 3.7 | 3.6 | 3.6 | 3.7 | 3.6 | 3.1 | 3.2 |
| $Li_2O$ | 2.3 | 2.3 | 2.3 | 2.3 | 2.3 | 2.2 | 2.2 |
| $ZrO_2$ | 1.6 | 3.2 | 3.2 | 3.8 | 3.2 | 4.6 | 5.4 |
| $WO_3$ | 7.0 | 7.0 | 7.0 | 6.1 | 7.0 | 6.0 | 6.0 |
| $La_2O_3$ | 16.5 | 15.5 | 16.3 | 15.3 | 17.9 | 15.8 | 16.0 |
| $Gd_2O_3$ | 4.1 | 4.2 | 0.0 | 4.1 | 0.0 | 3.9 | 4.0 |
| $Y_2O_3$ | 2.9 | 2.7 | 6.1 | 1.9 | 4.5 | 2.0 | 2.0 |
| $Nb_2O_5$ | 0.0 | 0.0 | 0.0 | 0.0 | 0.0 | 0.0 | 0.0 |
| La + Gd + Y | 23.5 | 22.4 | 22.4 | 21.3 | 22.4 | 21.7 | 22.0 |
| Gd + Ta | 7.8 | 7.8 | 3.6 | 7.8 | 3.6 | 7.0 | 7.2 |
| Lanthanum ratio | 0.72 | 0.70 | 0.79 | 0.72 | 0.85 | 0.72 | 0.70 |

TABLE 8

| mol % | Example 8 | Example 9 | Example 10 | Example 11 | Example 12 | Example 13 | Example 14 |
|---|---|---|---|---|---|---|---|
| $B_2O_3$ | 27.3 | 26.3 | 27.1 | 31.4 | 28.9 | 30.4 | 30.5 |
| $SiO_2$ | 17.1 | 17.0 | 17.0 | 13.8 | 16.0 | 12.4 | 13.4 |

TABLE 8-continued

| mol % | Example 8 | Example 9 | Example 10 | Example 11 | Example 12 | Example 13 | Example 14 |
|---|---|---|---|---|---|---|---|
| ZnO | 16.6 | 18.1 | 18.1 | 16.3 | 12.8 | 18.4 | 18.5 |
| $Ta_2O_5$ | 3.2 | 3.2 | 3.2 | 5.3 | 3.3 | 3.7 | 4.7 |
| $Li_2O$ | 2.3 | 2.2 | 2.2 | 3.7 | 5.3 | 2.4 | 2.3 |
| $ZrO_2$ | 4.7 | 4.6 | 4.6 | 3.3 | 4.8 | 3.2 | 3.2 |
| $WO_3$ | 6.1 | 6.0 | 6.0 | 4.1 | 6.2 | 7.0 | 7.0 |
| $La_2O_3$ | 16.0 | 15.9 | 16.3 | 16.7 | 16.9 | 15.4 | 17.4 |
| $Gd_2O_3$ | 4.7 | 3.9 | 3.9 | 4.3 | 4.1 | 0.0 | 2.0 |
| $Y_2O_3$ | 2.0 | 2.8 | 1.6 | 1.1 | 1.7 | 7.1 | 1.1 |
| $Nb_2O_5$ | 0.0 | 0.0 | 0.0 | 0.0 | 0.0 | 0.0 | 0.0 |
| La + Gd + Y | 22.7 | 22.6 | 21.8 | 22.1 | 22.7 | 22.5 | 20.5 |
| Gd + Ta | 7.9 | 7.1 | 7.1 | 9.6 | 7.4 | 3.7 | 6.7 |
| Lanthanum ratio | 0.79 | 0.72 | 0.85 | 0.72 | 0.70 | 0.79 | 0.72 |

TABLE 9

| mol % | Example 15 | Example 16 | Example 17 | Example 18 | Example 19 | Example 20 | Example 21 |
|---|---|---|---|---|---|---|---|
| $B_2O_3$ | 29.2 | 24.2 | 25.5 | 23.7 | 34.2 | 31.4 | 30.4 |
| $SiO_2$ | 14.2 | 16.1 | 16.5 | 16.7 | 15.8 | 15.8 | 15.7 |
| ZnO | 18.5 | 9.7 | 9.9 | 9.2 | 10.2 | 18.9 | 18.8 |
| $Ta_2O_5$ | 4.3 | 3.6 | 3.7 | 6.3 | 6.4 | 1.7 | 1.6 |
| $Li_2O$ | 2.3 | 8.9 | 9.1 | 8.4 | 5.1 | 2.4 | 2.3 |
| $ZrO_2$ | 3.2 | 4.0 | 3.3 | 8.1 | 7.5 | 3.3 | 4.9 |
| $WO_3$ | 6.6 | 6.5 | 5.8 | 0.0 | 1.0 | 3.9 | 3.9 |
| $La_2O_3$ | 16.2 | 15.3 | 15.6 | 19.7 | 17.7 | 16.9 | 16.8 |
| $Gd_2O_3$ | 3.9 | 8.9 | 9.1 | 7.3 | 3.0 | 3.8 | 3.8 |
| $Y_2O_3$ | 1.6 | 2.8 | 1.7 | 0.0 | 0.0 | 1.9 | 1.9 |
| $Nb_2O_5$ | 0.0 | 0.0 | 0.0 | 0.6 | 1.2 | 0.0 | 0.0 |
| La + Gd + Y | 21.7 | 27.0 | 26.4 | 28.1 | 22.8 | 22.6 | 22.4 |
| Gd + Ta | 8.2 | 12.5 | 12.8 | 14.7 | 11.5 | 5.4 | 5.4 |
| Lanthanum ratio | 0.85 | 0.57 | 0.59 | 0.73 | 0.86 | 0.75 | 0.75 |

TABLE 10

| mol % | Example 22 | Example 23 | Example 24 | Example 25 | Example 26 | Example 27 | Example 28 |
|---|---|---|---|---|---|---|---|
| $B_2O_3$ | 31.2 | 30.9 | 30.9 | 31.4 | 31.4 | 31.4 | 31.2 |
| $SiO_2$ | 15.7 | 15.5 | 15.5 | 15.8 | 15.8 | 15.8 | 15.7 |
| ZnO | 18.8 | 18.6 | 21.8 | 18.9 | 18.9 | 18.9 | 18.8 |
| $Ta_2O_5$ | 0.9 | 1.6 | 1.6 | 1.7 | 1.7 | 2.4 | 2.4 |
| $Li_2O$ | 2.3 | 2.3 | 0.8 | 2.4 | 2.4 | 2.4 | 2.3 |
| $ZrO_2$ | 4.9 | 3.3 | 3.3 | 3.3 | 3.3 | 3.3 | 4.9 |
| $WO_3$ | 3.9 | 3.9 | 3.9 | 3.9 | 3.9 | 3.9 | 3.9 |
| $La_2O_3$ | 16.8 | 16.6 | 16.6 | 16.1 | 15.3 | 16.1 | 15.2 |
| $Gd_2O_3$ | 3.8 | 3.7 | 3.7 | 4.6 | 4.6 | 3.8 | 3.8 |
| $Y_2O_3$ | 1.9 | 1.9 | 1.9 | 1.9 | 2.7 | 1.9 | 1.9 |
| $Nb_2O_5$ | 0.0 | 0.0 | 0.0 | 0.0 | 0.0 | 0.0 | 0.0 |
| $TiO_2$ | 0.0 | 1.6 | 0.0 | 0.0 | 0.0 | 0.0 | 0.0 |
| La + Gd + Y | 22.4 | 22.2 | 22.2 | 22.6 | 22.6 | 21.8 | 20.8 |
| Gd + Ta | 4.6 | 5.4 | 5.4 | 6.2 | 6.2 | 6.2 | 6.2 |
| Lanthanum ratio | 0.75 | 0.75 | 0.75 | 0.71 | 0.68 | 0.74 | 0.73 |

TABLE 11

| mol % | Example 29 | Example 30 | Example 31 | Example 32 | Example 33 | Example 34 | Example 35 |
|---|---|---|---|---|---|---|---|
| $B_2O_3$ | 31.4 | 31.3 | 29.4 | 29.4 | 33.3 | 31.2 | 33.3 |
| $SiO_2$ | 15.8 | 15.7 | 18.6 | 18.6 | 12.7 | 15.7 | 12.7 |
| ZnO | 18.9 | 18.9 | 18.6 | 18.6 | 19.1 | 18.8 | 19.1 |
| $Ta_2O_5$ | 4.0 | 1.7 | 2.4 | 2.4 | 2.5 | 1.6 | 1.7 |
| $Li_2O$ | 2.4 | 2.4 | 2.3 | 2.3 | 2.4 | 2.3 | 2.4 |
| $ZrO_2$ | 3.3 | 3.3 | 3.3 | 3.3 | 4.9 | 4.9 | 4.9 |
| $WO_3$ | 3.9 | 3.9 | 3.9 | 3.9 | 4.0 | 3.9 | 4.0 |
| $La_2O_3$ | 14.5 | 16.8 | 15.9 | 15.1 | 15.4 | 15.2 | 15.4 |
| $Gd_2O_3$ | 3.8 | 3.8 | 3.7 | 4.5 | 3.8 | 4.5 | 4.6 |
| $Y_2O_3$ | 1.9 | 1.9 | 1.9 | 1.9 | 1.9 | 1.9 | 1.9 |
| $Nb_2O_5$ | 0.0 | 0.0 | 0.0 | 0.0 | 0.0 | 0.0 | 0.0 |

TABLE 11-continued

| mol % | Example 29 | Example 30 | Example 31 | Example 32 | Example 33 | Example 34 | Example 35 |
|---|---|---|---|---|---|---|---|
| $TeO_2$ | 0.0 | 0.3 | 0.0 | 0.0 | 0.0 | 0.0 | 0.0 |
| La + Gd + Y | 20.2 | 22.5 | 21.5 | 21.5 | 21.2 | 21.6 | 22.0 |
| Gd + Ta | 7.8 | 5.4 | 6.1 | 6.9 | 6.3 | 6.2 | 6.3 |
| Lanthanum ratio | 0.72 | 0.75 | 0.74 | 0.70 | 0.73 | 0.70 | 0.70 |

TABLE 12

| mol % | Example 36 | Example 37 |
|---|---|---|
| $B_2O_3$ | 38.1 | 37.6 |
| $SiO_2$ | 8.3 | 9.8 |
| ZnO | 18.2 | 18.8 |
| $Ta_2O_5$ | 3.3 | 3.3 |
| $Li_2O$ | 4.1 | 2.9 |
| $ZrO_2$ | 5.0 | 4.9 |
| $WO_3$ | 3.3 | 3.3 |
| $La_2O_3$ | 13.9 | 13.3 |
| $Gd_2O_3$ | 4.9 | 4.7 |
| $Y_2O_3$ | 0.9 | 1.4 |
| $Nb_2O_5$ | 0.0 | 0.0 |
| $TeO_2$ | 0.0 | 0.0 |
| La + Gd + Y | 19.7 | 19.4 |
| Gd + Ta | 8.2 | 8.0 |
| Lanthanum ratio | 0.71 | 0.69 |

While the invention has been described in detail and with reference to specific embodiments thereof, it will be apparent to one skilled in the art that various changes and modifications can be made therein without departing from the spirit and scope thereof.

This application is based on Japanese Patent Application No. 2009-129247 filed on May 28, 2009, the entirety of which is incorporated herein by way of reference.

All references cited herein are incorporated by reference herein in their entirety.

An optical glass suitable as an optical element to be used in optical systems of digital cameras and the like can be provided.

What is claimed is:

1. An optical glass comprising, in terms of mass % on the basis of oxides:
   $B_2O_3$: 10 to 20%,
   $SiO_2$: more than 2 to 12%,
   ZnO: 5 to 19%,
   $Ta_2O_5$: 2.5 to 17%,
   $Li_2O$: 0.2 to 3%,
   $ZrO_2$: 0.6 to 4.9%,
   $WO_3$: 1 to 20%,
   $La_2O_3$: 25 to 50%,
   $Gd_2O_3$: 0 to 13%, and
   $Y_2O_3$: 0.2 to 20%,
   provided that $La_2O_3+Gd_2O_3+Y_2O_3$ is 35 to 60%,
   wherein the optical glass does not substantially comprise $Nb_2O_5$, and has a refractive index ($n_d$) of 1.82 to 1.86, an Abbe's number ($v_d$) of 37 to 44 and a glass transition point ($T_g$) of 630° C. or lower.

2. The optical glass according to claim 1, having a liquidus temperature ($T_L$) of 1130° C. or lower.

3. The optical glass according to claim 2, wherein, at the liquidus temperature ($T_L$) or lower of the optical glass, a plurality of devitrified substances do not precipitate and only $LaBO_3$ precipitates.

4. The optical glass according to claim 1, having a liquidus temperature viscosity ($\eta_{TL}$) of 5 dPa·s or more.

5. The optical glass according to claim 1, wherein a mass % fraction of a content of $La_2O_3$ to a total content of $La_2O_3$, $Gd_2O_3$, $Y_2O_3$ and $Yb_2O_3$ is 0.67 to 0.90.

6. A preform for precision press molding, comprising the optical glass according to claim 1.

7. An optical element obtained by subjecting the optical glass according to claim 1 to precision press molding.

8. The optical glass according to claim 1, wherein the mass % on the basis of oxides is:
   $B_2O_3$: 12 to 19.5%,
   $SiO_2$: more than 2 to 10%,
   ZnO: 6.5 to 17%,
   $Ta_2O_5$: 8 to 13%,
   $Li_2O$: 0.5 to 2%,
   $ZrO_2$: 1.5 to 4.5%,
   $WO_3$: 8 to 16%,
   $La_2O_3$: 30 to 46%,
   $Gd_2O_3$: 2 to 12%, and
   $Y_2O_3$: 1 to 15%,
   provided that $La_2O_3+Gd_2O_3+Y_2O_3$ is 43 to 55%.

9. An optical glass comprising, in terms of mol % on the basis of oxides:
   $B_2O_3$: 20 to 40%,
   $SiO_2$: 8.3 to 30%,
   ZnO: 10 to 34%,
   $Ta_2O_5$: 0.8 to 8%,
   $Li_2O$: 0.5 to 15%,
   $ZrO_2$: 0.5 to 10%,
   $WO_3$: 3 to 15%,
   $La_2O_3$: 10 to 25%,
   $Gd_2O_3$: 0 to less than 5%, and
   $Y_2O_3$: 0.1 to 15%,
   provided that $La_2O_3+Gd_2O_3+Y_2O_3$ is 15 to 30%,
   wherein the optical glass does not substantially comprise $Nb_2O_5$, and has a refractive index ($n_d$) of 1.82 to 1.86 and an Abbe's number ($v_d$) of 37 to 44 and a glass transition point ($T_g$) of 630° C. or lower.

* * * * *